United States Patent [19]
Walker

[11] 4,096,068
[45] Jun. 20, 1978

[54] CAST BEAMS FOR FILTERBED WITH CROSS FLOW AT ENDS

[75] Inventor: James Donald Walker, Aurora, Ill.

[73] Assignee: Peabody Galion Corporation, Roscoe, Ill.

[21] Appl. No.: 715,998

[22] Filed: Aug. 19, 1976

[51] Int. Cl.² .............................................. B01D 23/18
[52] U.S. Cl. ..................................... 210/293; 264/299
[58] Field of Search ............... 210/274, 293, 220, 150; 264/228, 299, DIG. 48

[56] References Cited

U.S. PATENT DOCUMENTS

| 694,577 | 3/1902 | Ransome | 264/228 X |
| 2,900,083 | 8/1959 | Oliver | 210/293 |
| 3,475,529 | 10/1969 | Lacy | 264/228 |

FOREIGN PATENT DOCUMENTS

| 8,050 | 9/1922 | Netherlands | 210/293 |
| 924,799 | 5/1963 | United Kingdom | 210/293 |

Primary Examiner—John Adee
Attorney, Agent, or Firm—Louis Robertson

[57] ABSTRACT

Pre-cast concrete beams for supporting a filterbed have deep downwardly extending flanges for providing an underchannel lengthwise of the beam. The beams generally extend across a flume. For backwashing with an air-water mixture, air should be supplied at substantially the same rate to all of the channels. Cross passages between the channels are an aid to this even distribution. Heretofore, special molding procedures for providing the passages or limbers through the beam flanges have increased manufacturing costs. According to the present invention, such passages are provided without extra molding steps and without extra cost by following a delightfully simple concept of merely omitting the end portions of the flanges where beam strength is not required. The end portion projecting beyond the flanges may have a leg across its end to ensure support and aid sealing.

5 Claims, 6 Drawing Figures

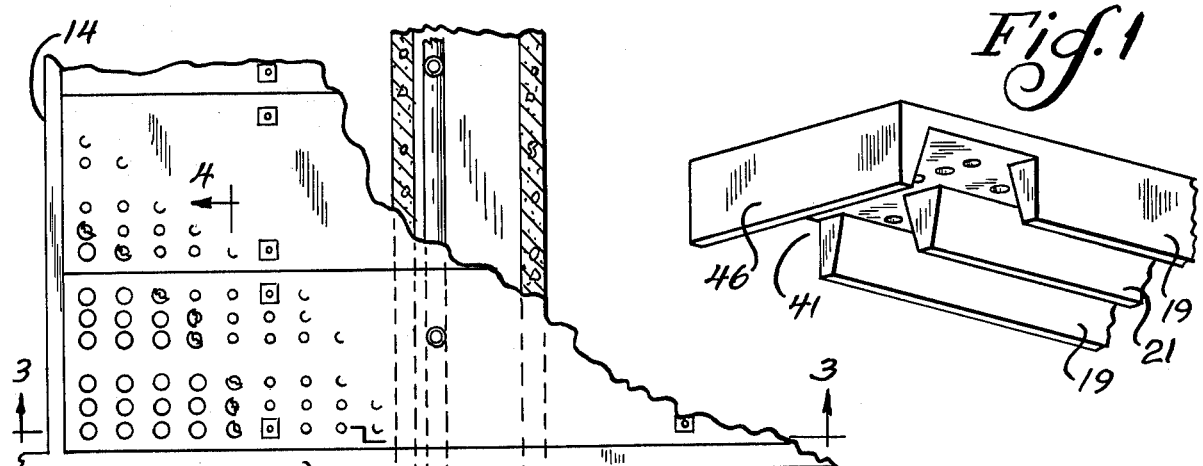
Fig. 1
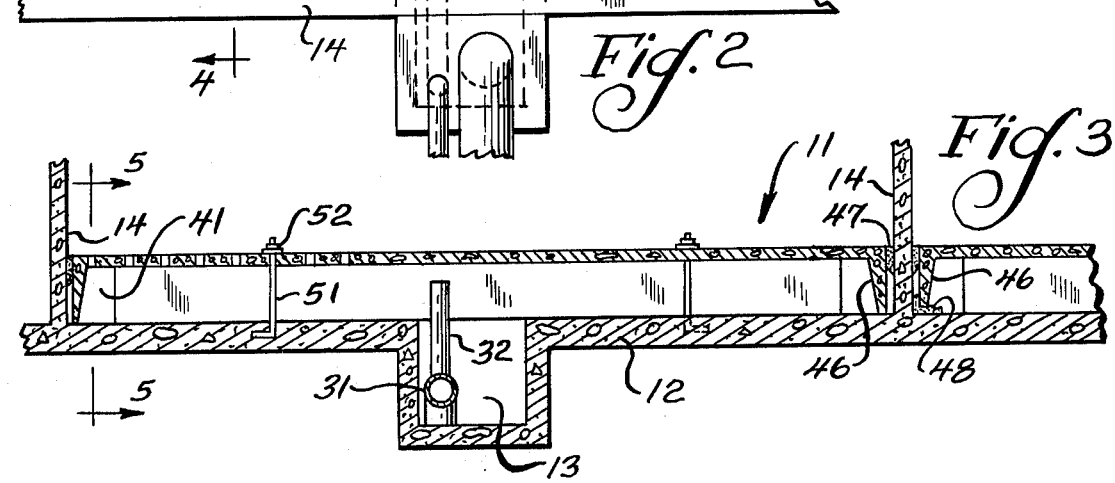
Fig. 2
Fig. 3
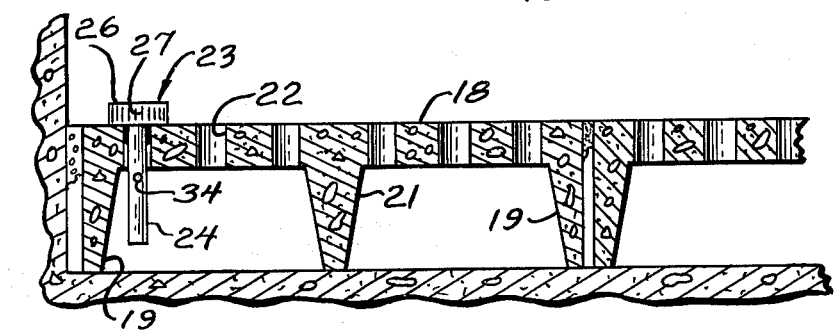
Fig. 4
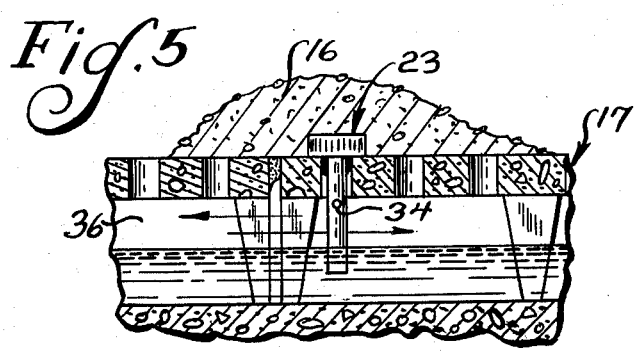
Fig. 5
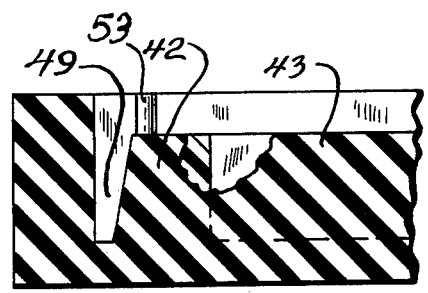
Fig. 6

CAST BEAMS FOR FILTERBED WITH CROSS FLOW AT ENDS

INTRODUCTION

The invention of which the present disclosure is offered for public dissemination in the event adequate patent protection is available relates to pre-cast filterbottom beams.

It has long been the practice to construct a filterbed floor or pre-cast beams of channel shape with the channels opening downwardly and the beams set across a sluiceway at the bottom of a filter tank. During filtering, the water being filtered would seep through the filter media supported by this floor and through slits or the like in nozzles extending through the floor, to flow lengthwise of each beam through its underchannel into the sluiceway, from which it would flow to storage tanks or a distribution main as filtered water. During backflushing, flushing water would be supplied to the sluiceway and would flow in reverse direction through the underchannels and up through the nozzles to backflush the bed supported by the floor. It is often desired to use an air and water mixture for this backflushing, and for this purpose the nozzles have been provided with tubes extending down beyond the floor with a restricted air passage through the side of the tube partway down, so that by supplying air as well as water to each underchannel, a layer of air would form above the water and flow through these openings to mix with the water flowing up through the tubes from their bottoms.

The present invention is concerned with the problem of achieving uniformity in the flow of air to the various underchannels. For some years, the practice was to provide air-supply piping which included a header in the sluiceway and a separate distribution pipe from the header into each underchannel. Later, the cost of some of this piping was saved by providing cross flow passages called "limbers" between the adjacent channels, through the upper parts of the flanges, i.e., just below the floor bottom, through which air could pass so freely that piping to every underchannel was no longer necessary. However, until the present invention, the providing of the cross passages was a nuisance and an expense because blocks or cores forming the cross passages had to be set in the mold, and later removed from the beam. The separate pieces were necessary because in order not to unduly reduce the beam strength of the beams, the passages were at an intermediate height of the beam and the lower portions of the flanges were to be uninterrupted.

According to the present invention, this nuisance and expense are avoided by recognizing that no great beam strength is needed at the ends of the beams and hence the entire flanges can be omitted at the area, this being accomplished with no separate inserts, so that the upper portion of the space thus formed would provide the cross-connecting air passages. Except for the end portions where the beam strength is not needed, the beam is of full strength, being entirely free from transverse apertures. Even though the beams are sometimes quite long, the cross connections at the end have been found to be adequate because the flow space through the beams can be quite large and the air flow space above the water can also be quite large, compared to the relatively small volume of air which is passed by the restricted openings even though these openings are numerous.

The advantages of the invention may be understood more thoroughly in the light of the following description and the drawings.

DESIGNATION OF FIGURES

FIG. 1 is a fragmentary, upward-looking, perspective type view of a preferred form of pre-cast filterbottom beam embodying the present invention.

FIG. 2 is a fragmentary view looking down on a plurality of beams such as that of FIG. 1, showing their use as a floor suitable for supporting a filterbed.

FIG. 3 is a vertical sectional view taken longitudinally of a beam, substantially along the line 3—3 of FIG. 2.

FIG. 4 is a vertical fragmentary sectional view taken transversely of the beams, showing one strainer-distribution nozzle in place.

FIG. 5 is a view representing the backwashing of a filterbed with an air-water mixture being discharged by the strainer-distribution nozzles.

FIG. 6 is a vertical sectional view, partly broken away, of a mold in which the beams of FIG. 1 may be cast.

BACKGROUND DESCRIPTION

The present invention can be understood more easily if the general construction and operation of filters is first described. A filter tank generally designated as 11 may include a concrete floor 12 having a downwardly extending sluiceway 13, and side walls 14 on all four sides of the filter. FIGS. 2 and 3 assume a large installation in which a number of filters or filter sections would be adjacent to one another, but the description may be concerned with a single filter or filter section enclosed by its four walls 14.

The essential part of filters is a bed 16 (FIG. 5) of particulate material through which water trickles downwardly during filtering. There must be some way for the water to get out and therefore the filterbeds 16 are generally supported on a filterbottom 17 which, in one manner or another, has passages through it and under it leading to an outflow passage such as the sluiceway 13. Where the filterbottom has been made up to pre-cast concrete beams to which the present invention relates, each beam has included a floor-panel 18, longitudinal side flanges 19, and sometimes an intermediate flange 21, forming underchannels. The floor panel 18 has been provided with numerous apertures 22 into each of which there is preferably sealed a strainer nozzle 23 having a downwardly extending tube 24 open at its bottom and communicating with a head 26 having therein numerous slots 27 intended to pass water but not the particles of the filter media.

For a filter to do any good, it necessarily entraps foreign particles in the water being filtered. Eventually these foreign particles will accumulate to the point of impeding flow downwardly through the filter and the filter must be cleaned. The most efficient manner of cleaning a filter is backwashing. In backwashing, the flow of water is reversed and a large flow of water pumped to the sluiceway 13, which is sealed to withstand water pressure, flows through the underchannels, upwardly through the tubes 24 and slits 27 and bed 16, carrying away with it (by overflow of the filter into backwash troughs) the foreign particles which the filter has collected. It is commonly desirable to use a mixture of water and air for the backwashing of the filter. To this end, air is pumped to a header 31 extending along the sluiceway 13 under the channel-shaped beams and distributed to different underchannels on the undersides of these beams by distribution risers 32. Formerly a separate distribution riser 32 was led to each underchannel to provide substantially the same flow of air to each underchannel so that in turn each nozzle 23 (now a distribution or diffuser nozzle) would have approximately the same flow through it, and uniform upflow across the area of the filterbed would result. With uniform upflow through the filterbed, it is possible to supply just the right amount of water so that the filterbed will be expanded by the upflow and the entrapped particles quickly removed. Because the entrapped particles are smaller than the filterbed particles, they will be carried off in the overflow while the filterbed particles will not be raised so high by the upflow as to overflow.

So that the flow of air will be substantially the same for all of the nozzles 23, the air is allowed to enter each tube 24 through a small aperture 34 which is so restricted that a backpressure can be developed sufficient for lowering the water level to form an airflow passage 36 above the water level as seen in FIG. 5. In other words, air is pumped into header 31 at such a rate that in order for this volume of air to pass through the restricted orifices 34, even though they are numerous, a backpressure will be developed that will lower the water level as indicated so that the airflow space 36 will be of relatively large cross section and the most remote orifices 34 will be subjected to substantially the same pressure as the orifices which are closest to the distribution risers 32. If desired, the orifice 34 may be positioned just above the desired water level for the described operation, so that no air will enter the tubes until the water level is forced down to expose the orifices.

This desired uniformity originally depended on providing a distribution riser 32 for each of the underchannels, and also in some way equalizing the flow through all of the distribution risers 32. Because the air pressure would necessarily be slightly lowered beyond each successive riser 32, the equalizing of the air flow presented a problem and even when it was achieved, achieving it was a nuisance. The present applicant recognized some time ago that the problem of equal flow to the different underchannels could be alleviated by providing cross communication between the underchannels. This was done by casting the concrete beams with apertures through the flanges 19 and 21, just below the level of the floor panels 18, so that air could flow fairly freely from one underchannel to another. This permitted great equalization of the air pressure within the various underchannels. If enough cross flow area was provided, it would no longer be necessary to provide an air riser 32 for each underchannel, every second or third underchannel being enough. However, the forming of the cross connections in the original manner proved very troublesome and relatively expensive inasmuch as the cross connecting passages must not be permitted to materially weaken the beam strength of the beams. This meant that they must be of only moderate size and muxt be located near the tops of the flanges and hence could only be formed in casting by inserting blocks or cores around which the concrete would be poured. When the cast beams were removed from the mold, the blocks would have to be individually knocked out of the flanges. If the blocks didn't fit snugly to the adjacent mold parts, there would be flashing that would then have to be trimmed away.

DESCRIPTION OF THE PRESENT INVENTION

According to the present invention, the cross connections are provided with no extra cost or inconvenience. A key factor in doing this is locating the cross connections 41, as seen in FIG. 1, near each end of a beam. By recognizing that at this point no great beam strength is needed, it becomes possible simply to omit an end portion of each flange 19 or 21 to form an aperture 41 large enough so that one aperture at each end of each flange would provide sufficient cross connection. Because the flange omission extends all the way to the bottom of the flange, no blocks or cores are needed. Thus as seen in FIG. 6, the mold is provided with a fixed upstanding portion 42 for each flange, which forms its gap 41 at the end thereof.

Actually, this upstanding portion 42 is merely a connecting bridge between two mold portions 43 which provide the underchannels, being spaced apart to form the flanges.

The mold can be made of separable sections so that outwardly facing surfaces need not have draft for removal of the beam from the mold.

It is preferred to provide a flange or leg 46 extending downwardly from the end of floor panel 18. This not only provides a factor of safety by supporting the end portion of the floor panel 18, but facilitates dependable sealing of the end by grouting 47. If desired, the leg 46 can be slightly shorter in its vertical dimension than flanges 19 and 21 to be sure that the load of the beams and the bed they support will be supported by flanges 19 and 21, independently of the end portions of the beams, which are of greatly reduced beam-strength. Any space below the legs 46 should be sealed by grout as at 48. In fact, the entire periphery of each beam 15 should be sealed, as by grout, so that flow is confined to the slits 27 in nozzles 23. The legs 46 present no manufacturing difficulty, being formed by a cavity 49 in the mold.

The beams should be securely held down to withstand the backwash pressure, and this may be accomplished by the bolts 51 having heads embedded in tank floor 12 and extending through the floor panels, with nuts 52 screwed down to clamp the beams 15 in place.

Upstanding mold portions 53 form the apertures 22 and similar apertures for bolts 51.

ACHIEVEMENT

By this delightfully simple invention, filterbottom beams are, with no extra cost or inconvenience, and perhaps even with some slight saving of concrete, formed with cross-connecting apertures which ensure substantially uniform air pressure at all air orifices 34 and hence the same flow of air into each tube 24. This permits providing fewer air-supply risers, and at the same time having the backwash upflow exceedingly uniform throughout the area of the filterbed.

The full-height gaps at the ends of the flanges are better than the former small openings or limbers in several other respects. (1) They avoid the old danger that, unless protective sleeves are inserted, grout or sealant inserted between adjacent beams will collect in a limber and reduce air flow. (2) They can easily provide more air cross-flow space than is likely to be provided by limbers. (3) They provide copious water cross-flow area, ensuring equality of water level and backflow volume between different underchannels during backwashing.

The anchor bolts are superior to former anchoring means in ease of installation with certainty of resisting the maximum heaving force that might be encountered in the backwash cycle, even if the nozzles become clogged. Some limitation on the water pressure, according to prior practice, is contemplated. With full beam strength (except near the beam ends, where shear resistance is enough) a relatively small number of anchor bolts is sufficient, e.g., two or three per channel.

I claim:

1. A precast elongate underchanneled floor beam of the class suitable for spanning across a filter-tank floor with an open sluiceway therein across which a number of such beams are laid, in side-by-side relationship, to form a floor for supporting a bed of particulate filter media, said beam including:
   a floor panel having therethrough apertures for receiving distribution nozzles and apertures for receiving tie down rods; and
   flanges formed as part of the same casting and extending downwardly from the floor panel to provide an underchannel extending lengthwise of the beam; said flanges being continuous along the intermediate portions of the length of the beam but being substantially totally omitted near the ends of the beam to provide a crossflow passage from said underchannel to the underchannel of an adjacent similar beam.

2. A precast elongate underchanneled floor beam of the class suitable for spanning across a filter-tank floor with an open sluiceway therein across which a number of such beams are laid, in side-by-side relationship, to form a floor for supporting a bed of particulate filter media, said beam including:
   a floor panel having therethrough apertures for receiving distribution nozzles and apertures for receiving tie down rods; and
   flanges formed as part of the same casting and extending downwardly from the floor panel to provide an underchannel extending lengthwise of the beam; said flanges being continuous along the intermediate portions of the length of the beam but being substantially totally omitted near the ends of the beam to provide a crossflow passage from said underchannel to the underchannel of an adjacent similar beam;
said floor panel, at each end beyond the flanges, being provided with a downwardly extending transverse flange, formed as part of the same casting, for aiding support and seal.

3. The method of making a mold-formed elongate underchanneled beam suitable for resting across a sluiceway in a filter-tank floor and being anchored to said floor on opposite sides of the sluiceway, and suitable for supporting a filterbed of particulate media, which includes filling a mold cavity which provides a shallow space for a floor panel; the mold having projections through said shallow space to form passages in said panel, some for receiving nozzles and some for receiving tie down rods; the cavity also having deep spaces extending longitudinally of said shallow space generally at right angles to the plane of the shallow space and opening to it for forming flanges on the floor panel to provide between them an underchannel, said spaces for the flanges extending substantially continuously along both longitudinal edges of the shallow space except being terminated near the ends of the shallow space by mold portions which extend approximately to the shallow space from the plane of the opposing edges of the flange-forming deep spaces to leave a corresponding passage for communication between the said channel and the channel of an adjacent similar beam after installation, said mold portions being so shaped as not to interfere with removal of the molded and hardened beam from the mold and not to require said mold portions to be separare pieces.

4. The method according to claim 3 in which the mold is filled by flowing the molding material into the cavity by gravity to form the beam by casting.

5. A mold-formed elongate underchanneled floor beam, for supporting a filterbed of particulate material and of the class suitable for spanning across a sluiceway in a filter-tank floor, said beam including:
   a floor panel having therethrough apertures for receiving distribution nozzles and apertures for receiving tie down rods, and
   flanges as part of the same molding and extending downwardly from the floor panel to provide an underchannel extending lengthwise of the beam; said flanges being substantially continuous along the intermediate portions of the length of the beam but being substantially totally omitted near the ends of the beam to provide a crossflow passage from said underchannel to the underchannel of an adjacent similar beam.

* * * * *

UNITED STATES PATENT AND TRADEMARK OFFICE
CERTIFICATE OF CORRECTION

PATENT NO. : 4096068
DATED : June 20, 1978
INVENTOR(S) : James Donald Walker

It is certified that error appears in the above-identified patent and that said Letters Patent are hereby corrected as shown below:

```
In column 5, line 10, change "I claim:" to
     -- CLAIMS (AREAS OF PROTECTION)   --

In column 6, line 28 (the last line of claim 3)
    change  "separare"  to    -- separate --.
```

Signed and Sealed this

*Tenth* Day of *April 1979*

[SEAL]

*Attest:*

RUTH C. MASON
*Attesting Officer*

DONALD W. BANNER
*Commissioner of Patents and Trademarks*